United States Patent [19]

Yokoyama

[11] Patent Number: 4,617,121

[45] Date of Patent: Oct. 14, 1986

[54] IN-TANK PUMP FILTER FOR AUTOMOBILE FUEL TANK

[75] Inventor: Naoshi Yokoyama, Nagoya, Japan

[73] Assignee: Nitco, Inc., Yokohama, Japan

[21] Appl. No.: 772,310

[22] Filed: Sep. 4, 1985

[30] Foreign Application Priority Data

Sep. 10, 1984 [JP] Japan .................... 59-136125

[51] Int. Cl.[4] ............................. B01D 35/02
[52] U.S. Cl. ................... 210/416.4; 210/452; 210/460; 210/541
[58] Field of Search ............ 210/416.4, 435, 445, 210/450, 451, 452, 168, 232, 541, 542, 455, 459, 460

[56] References Cited

U.S. PATENT DOCUMENTS 3,900,397  8/1975  Bell .................... 210/416.4

Primary Examiner—Frank Sever
Attorney, Agent, or Firm—Trexler, Bushnell & Wolters, Ltd.

[57] ABSTRACT

A filter for in-tank pump use, comprising a tubular filter which incorporates an auxiliary tubular member provided, via a hollow head member, on the fuel inlet of the in-tank pump in a fuel tank, such as that of an automobile, the auxiliary tubular member having a downward-facing opening positioned below the level of the in-tank pump inlet. In substance there is thereby formed an inlet that is lower than the in-tank pump inlet, which makes it possible to effectively maximize the amount of fuel that can be drawn from the tank.

2 Claims, 3 Drawing Figures

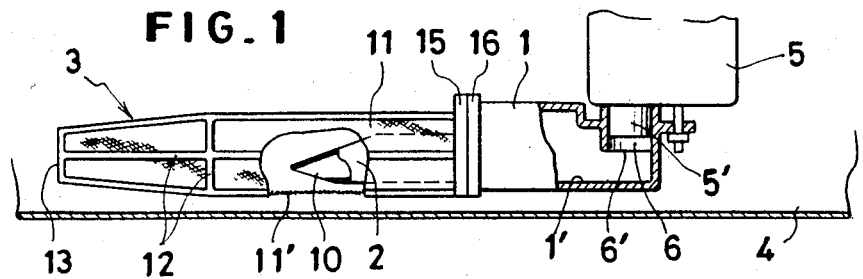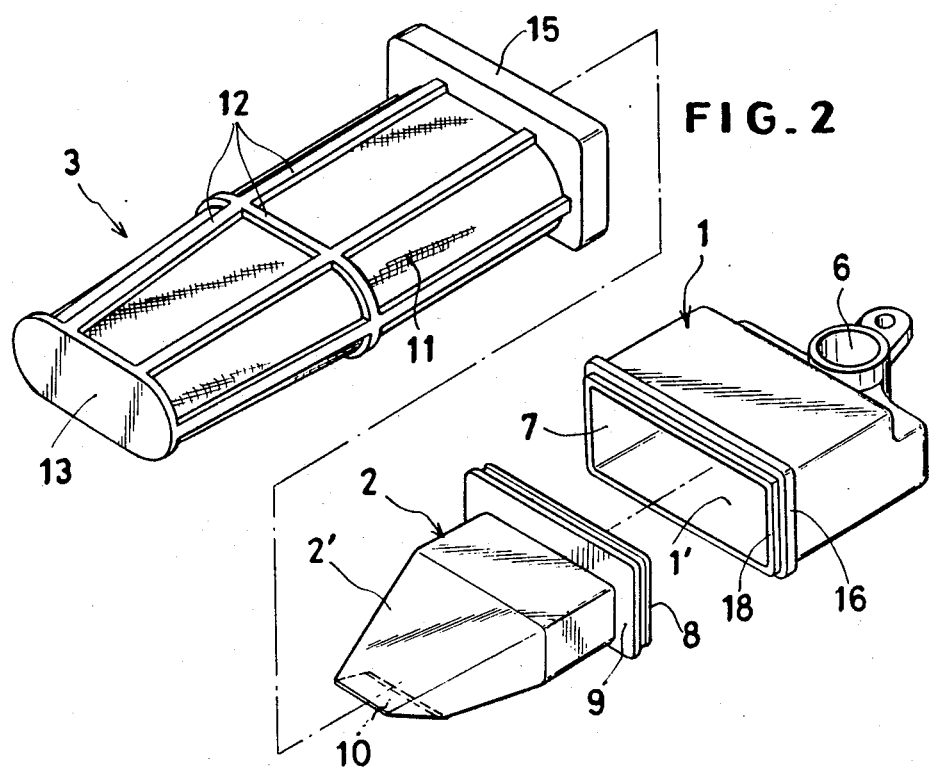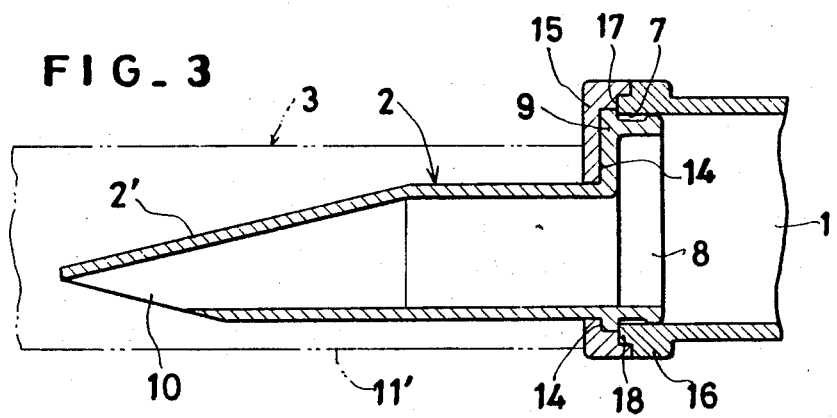

IN-TANK PUMP FILTER FOR AUTOMOBILE FUEL TANK

FIELD OF THE INVENTION AND RELATED ART STATEMENT

This invention relates to a fuel filter for fitting to the inlet of a pump provided in the fuel tank of an automobile.

In ordinary automobiles, a horizontal tubular filter roughly parallel with the floor of the fuel tank is provided on the in-tank fuel pump inlet which is an opening which faces downwards near the floor of the tank, the fuel in the tank being filtered by the tubular filter and then being supplied to the carburetor by the in-tank pump. With conventional filters, the level of the downward-facing inlet of the in-tank pump marks the lower limit of the fuel which can be pumped out by the in-tank pump, the pump being unable to pump out fuel below that level.

OBJECT AND SUMMARY OF THE INVENTION

The object of the present invention is to provide a filter for the in-tank pump of an automobile which maximizes the amount of fuel that can be pumped out of the tank, enabling the fuel to be expelled effectively with a minimal amount of fuel remaining.

In order to achieve this object, the filter according to the present invention comprises three members: a flat hollow head member provided on one end thereof with a tubular attachment portion affixed vertically to the inlet of a pump and on the other end thereof with a horizontal opening, a flat auxiliary tubular member provided at one end with a flange which fits into the horizontal opening and having at its other end a downward-facing opening which is lower than the lower edge of the tubular attachment portion of the hollow head member, the auxiliary tubular member having at one end a flange provided with an engaging portion for engagement with the horizontal opening and having at its other end a downward-facing opening which opens below the level of the lower edge of the tubular attachment portion of the hollow head member and a flat tubular filter member having a mesh that is housed in the auxiliary tubular member and which is provided at one end with an inset that engages with the flange of the auxiliary tubular member.

Because the opening of the auxiliary tubular member which communicates with the horizontal opening in the hollow head member within the tubular filter member faces downwards, it is possible to draw up fuel that is below the level of the in-tank inlet. This enables the fuel in the tank to be used effectively to the maximum.

Other objects and features of this invention will be clear from the following detailed description made with reference to the accompanying drawings.

BRIEF DESCRIPTION OF THE DRAWINGS

FIG. 1 is a side view of one embodiment of the in-tank pump filter according to this invention, showing a partially cutaway view of the filter fitted to the pump in the fuel tank;

FIG. 2 is a perspective view of the parts in a state of disassembly; and

FIG. 3 is a cross-sectional view of the union of the main parts.

DESCRIPTION OF THE PREFERRED EMBODIMENTS

In the drawings, 1 is the hollow head member, 2 the auxiliary tubular member and 3 the tubular filter member, each of which are flat in shape and formed in plastic. The numeral 4 denotes the floor of the fuel tank, 5 the in-tank pump and 5' the downward-facing inlet thereof.

The hollow head member 1 is provided at one end with a vertically arranged tubular attachment portion 6 which is fitted onto the inlet 5' of the pump 5 from below, the lower edge 6' of the tubular attachment portion 6 being vertically separated by a certain amount from the bottom wall 1' of the hollow head member 1. At its other end the hollow head member 1 is provided with an horizontal opening 7.

The auxiliary tubular member 2 has at one end a flange 9 provided with an engaging portion 8 which engages into the opening 7, and has at its other end a downward-facing opening 10. Also, in this embodiment the auxiliary tubular member 2 narrows towards its other end 2'. The tubular filter member 3 comprises mesh 11, longitudinal and transverse bracing ribs 12, an end wall 13, and at the front end an inset 14 into which the flange 9 fits.

Assembly is carried out by fitting the engaging portion 8 of the auxiliary tubular member 2 into the horizontal opening 7 of the hollow head member 1 until the flange 9 abuts the end face, the flange 9 simultaneously coming into contact with the bottom of the inset 14 as it fits into the inset of the tubular filter member 3, the end face of the horizontal opening 7 of the hollow head member thereby being brought into juxtaposition with the inset, in which state the contacting portions can be welded together, for example by ultrasonic welding, to form a single unit. The inset 14 of the tubular filter member 3 is formed in a flange 15 provided at one end of the filter member 3, and the end of the hollow head member 1 having the horizontal opening 7 is also provided with a flange 16, and, as shown in the drawings, either one of the flanges may be provided with a secondary inset 17 that is larger than the inset 14 and the other flange provided with a protruding portion 18 that fits into the secondary inset 17. In the embodiment shown the secondary inset 17 is provided on the flange 15 and the protruding portion 18 on the flange 16, but this arrangement may be reversed.

Thus, the auxiliary tubular member 2 can be housed in the tubular filter member 3 in communication with the horizontal opening 7 of the hollow head member 1, in which state the downward-facing opening 10 of the auxiliary tubular member 2 is located lower than the lower edge of the tubular attachment portion of the hollow head member 1, in close proximity to the lower inside surface of the tubular filter member mesh.

Therefore, whereas with the conventional type fuel could only be drawn out down the level of the lower edge of the tubular attachment portion, with the present invention it is possible to draw fuel out to a lower level, down to the level of the downward-facing opening 10 of the auxiliary tubular member 2. And, if the filter mesh 11 is soaked with fuel, fuel can be drawn out to an even lower level, down to the lower surface 11' of the mesh 11. Also, the horizontal opening of the hollow head member fits into place around the periphery of the flange 9 of the auxiliary tubular member 2 while the inset 4 of the tubular filter member 3 also fits into place around the periphery of the flange 9, thereby bringing the end face of the horizontal opening 7 in the hollow head member 1 into abutment with the face of the inset 14 of the tubular filter member 3, providing a perfect seal between the hollow head member 1, the auxiliary tubular member 2 and the tubular filter member 3, thereby fully preventing fuel that has not been filtered by the mesh 11 from being drawn up by the pump.

What is claimed is:

1. A filter comprising:
means for enabling use in a fuel tank in combination with a vertically downwardly facing inlet of an in-tank pump of an automobile, including a flat hollow head member including on one end thereof a tubular attachment portion for connection to a vertically downwardly facing inlet of an in-tank pump and at the other end thereof a horizontal opening; a flat auxiliary tubular member including a flange with an engaging portion at one end thereof for engaging said head member around said horizontal opening, said auxiliary tubular member including at its other end a downwardly facing opening which opens below the level of a lower edge of the tubular attachment portion of the hollow head member; and a flat tubular filter member having a mesh surrounding the auxiliary tubular member and including a flange at one end thereof abutting said first mentioned flange, said second mentioned flange including an inset receiving a portion of said first mentioned flange of the auxiliary tubular member.

2. The in-tank pump filter of claim 3 wherein said horizontal opening of the hollow head member is fitted into place around the periphery of the engaging portion of the auxiliary tubular member and the inset of the tubular filter member is fitted into place around the periphery of the flange of the auxiliary tubular member, thereby bringing the end face of said horizontal opening into abutment with the inset of the tubular filter member to consolidate the hollow head member, auxiliary tubular member and tubular filter member into a single unit.

* * * * *